United States Patent [19]
Smith

[11] 3,838,995
[45] Oct. 1, 1974

[54] METHOD AND APPARATUS FOR DIRECT FORMATION OF GLASS FIBER SLURRY

[75] Inventor: Harvell M. Smith, Aurora, Colo.

[73] Assignee: Johns-Manville Corporation, Greenwood Village, Colo.

[22] Filed: Oct. 20, 1972

[21] Appl. No.: 299,514

[52] U.S. Cl............................. 65/2, 55/244, 65/9, 65/11 R, 162/156
[51] Int. Cl.......................................... C03b 37/00
[58] Field of Search ............ 65/2, 9, 11 R; 162/152, 162/156, 157 C; 264/176 F; 55/229, 244, 236

[56] References Cited
UNITED STATES PATENTS

| 3,021,255 | 2/1962 | Simpson............................ 162/156 |
| 3,050,427 | 8/1962 | Slayter et al........................ 65/2 X |
| 3,228,825 | 1/1966 | Waggoner....................... 162/156 X |
| 3,608,279 | 9/1971 | West................................. 55/229 X |
| 3,673,769 | 7/1972 | Gleason............................ 55/236 X |

FOREIGN PATENTS OR APPLICATIONS 568,425   1/1959   Canada............................. 162/156

Primary Examiner—Robert L. Lindsay, Jr.
Attorney, Agent, or Firm—John A. McKinney; Robert M. Krone; John D. Lister

[57] ABSTRACT

A method of forming a glass fiber slurry comprises forming glass fibers of discrete length within a collection chamber and depositing the glass fibers in a body of liquid within the collection chamber. The slurry thus formed is pumped directly to a wet process machine where it is formed into a mat by separating the liquid from the fibers.

16 Claims, 1 Drawing Figure

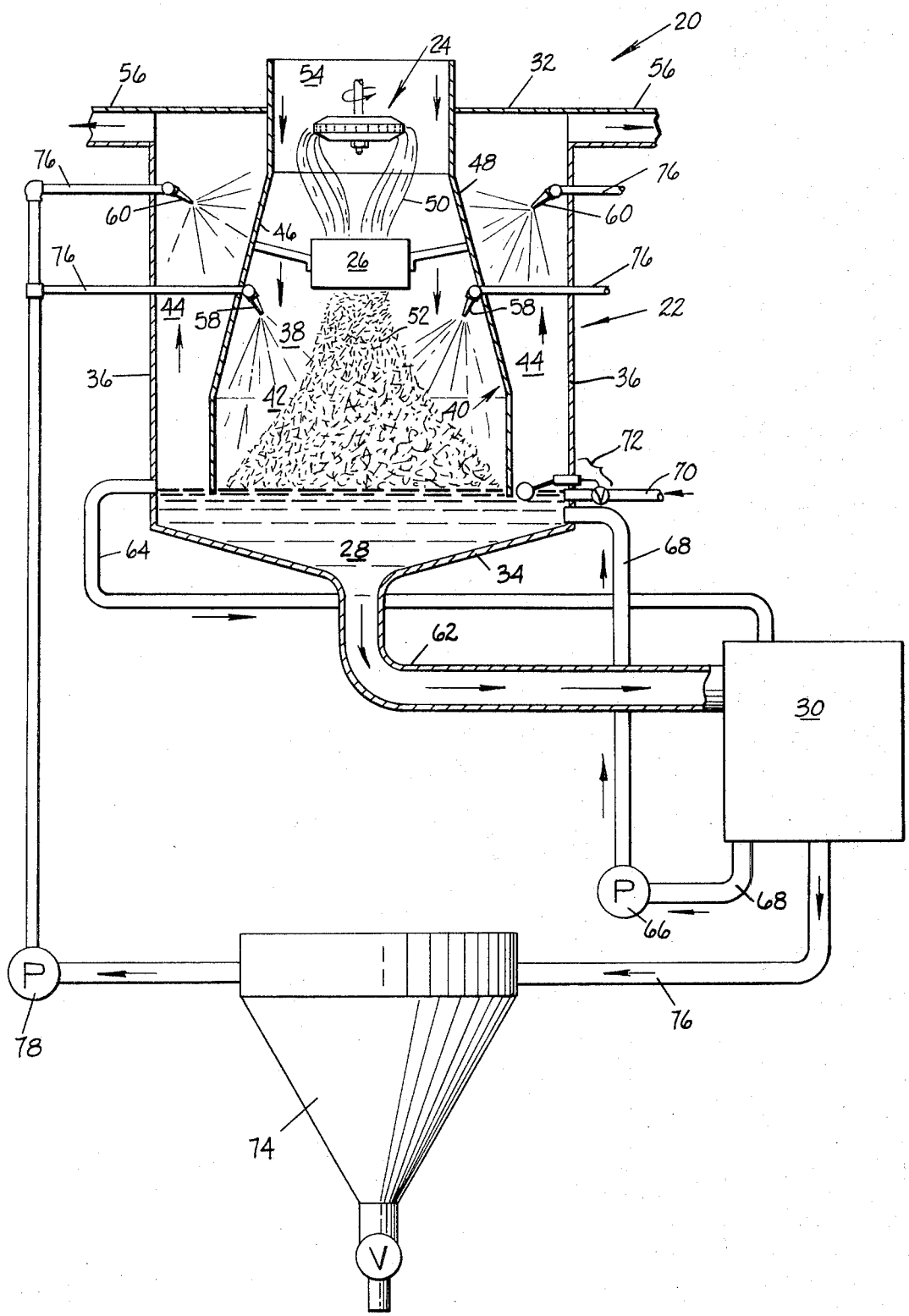

METHOD AND APPARATUS FOR DIRECT FORMATION OF GLASS FIBER SLURRY

BACKGROUND OF THE INVENTION

This invention relates to a process and apparatus for generating a slurry of glass fiber and, in particular, to a method and apparatus for forming the slurry within a collection chamber of a fiber forming process.

Normally, slurries of heat softenable fibrous materials are formed in a series of individual operations. After they are formed, the fibrous materials are wound on a bobbin or collected on a moving belt. The fibers are then transported to a separate piece of equipment where they are chopped or broken to desired lengths. Once they have been chopped or broken to the proper length, the fibers are then transported to a third device where they are mixed with a liquid to form a slurry.

SUMMARY OF THE INVENTION

Consequently, it is an object of the present invention to provide an apparatus and method for making a slurry of heat softenable fibers wherein the several separate steps commonly associated with the making of slurries are eliminated and the slurry is formed within a collection chamber of a fiber-forming apparatus.

Accordingly, the present invention provides a method and apparatus for forming glass fibers of discrete lengths within a collection chamber and for depositing the glass fibers in a body of liquid within the collection chamber to thereby form the slurry.

BRIEF DESCRIPTION OF THE DRAWING

The FIGURE is a schematic representation of the apparatus of the present invention.

DESCRIPTION OF THE PREFERRED EMBODIMENT

The direct slurry generating apparatus is generally designated by reference character 20 in the FIGURE. The apparatus comprises a collection chamber 22, glass filament forming apparatus 24, filament length control devices 26, and a body of liquid 28 (generally water) located at the bottom of the collection chamber 22. The direct slurry generating apparatus 20 is connected to a conventional wet process machine 30 which is utilized to form the slurry into a desired product.

There can be any number of filament forming apparatus 24 and filament length control devices 26 associated with the chamber 22. The chamber 22 can be elongated to accommodate a series of fiber-forming apparatus and filament length control devices or the chamber can be designed to accommodate a single filament forming apparatus 24 and filament length control device 26.

The collection chamber 22 is generally rectangular in horizontal cross section and comprises an upper wall 32, a lower wall 34 plus two sidewalls 36 and two end walls 38 (only one of which is shown) extending between and secured to the upper and lower walls. The chamber 22 is provided with a hood 40 which divides the collection chamber into inner and outer compartments 42 and 44 respectively. The hood has two walls 46 and 48 which extend between and are secured to the opposed end walls 38 of the chamber. The upper portions of the hood walls 46 and 48 define a narrow, elongate portion of the inner compartment 42 within which the filament forming apparatus 24 are located. The lower portions of the hood walls 46 and 48 diverge from each other whereby the inner chamber has a larger cross-sectional area at the bottom than at the top. The outer compartments 44, defined by the diverging hood walls 46 and 48 and the sidewalls 36 of the collection chamber are larger in cross-sectional area at the top than at the bottom.

Units of the filament producing apparatus 24 and the fiber length control devices 26 are located at intervals within the inner compartment of the collection chamber 22. While it is contemplated that other types of glass filament forming apparatus 24 can be employed, one of a series of conventional rotary fiberizing apparatus is shown in the FIGURE. The glass fiber length control devices 26 are supported by brackets within the inner compartment 42 below the rotary fiberizing apparatus. The length control devices 26 can be choppers or other conventional means for forming the continuous glass filaments 50 produced by the fiberizing units into fibers 52 of discrete lengths.

The direct slurry generating apparatus 20 is also provided with conventional apparatus such as air compressors or fans not shown which direct a stream of gas such as air into the inner compartment 42. The air stream not only provides the required air flow for the fiber-forming process, but also provides a positive force that directs the glass fibers 52 down into the body of liquid 28. The air stream as shown by the arrows in the FIGURE, passes down through openings 54 in the upper wall 32. The air flows past the filament forming units which are centered relative to openings 54 and down through the inner compartment 42 to the surface of the liquid 28 carrying the fibers 52 with it. The air then passes beneath the lower edge of the inner compartment 42, picking up moisture from the liquid 28, and up through the outer compartments 44 where it is exhausted through exhaust lines 56 to the atmosphere.

The inner and outer chambers are provided with spray nozzles 58 and 60 which spray liquid into the air stream. The liquid is picked up by the glass fibers which become heavier and thus the sprays help to remove the glass fibers 52 from the air stream and deposit them in the liquid 28. The nozzles 58 are arranged in rows which extend horizontally along the inner surfaces of walls 46 and 48 between the end walls 38 at about the level of the fiber length control devices 26. The nozzles 58 are directed both inward and downward so that the spray from the nozzles carries the glass fibers 52 down into the body of liquid 28. The nozzles 60 are arranged in rows which extend horizontally along the inner surfaces of walls 36 between end walls 38. The nozzles are located below the level of the exhaust lines 56 and are directed both inward and downward so that the spray will carry any fibers remaining in the air stream down into the body of liquid 28.

The collection chamber 22 is provided with a conduit 62 that is located at a low point in the bottom wall 34 of the chamber. The conduit 62 delivers the slurry formed in the chamber to the wet process machine 30 for producing a product from the slurry. One such machine is a fourdrinier where the slurry is passed through a screen which retains the glass fibers to form a mat and allows the liquid to pass through for recirculation. A supplemental conduit 64 is also provided in one of the sidewalls 36 of the chamber. This conduit is located a short distance above the lower edges of the hood 40 and also delivers slurry to the wet process machine 30. The slurry is drawn off by the conduit 64 to prevent the body of liquid 28 from exceeding a depth above the lower edge of the hood that is over a couple of inches (e.g., 1–2 inches).

As mentioned above, the wet process machine 30 is a machine of the type which separates the fibers from the liquid of the slurry. The machine is typically a machine for producing a wet process mat such as a fourdrinier type machine. After the liquid is separated from the fibers, the liquid is pumped back by pump 66 to the body of liquid 28 in the collection chamber through a conduit 68. While this source of liquid is the primary source for replenishing the body of liquid 28 in the collection chamber 22, a supply line 70 is provided to make up any losses in the slurry liquid. The supply line 70 is located in the sidewall 36 of the collection chamber and the flow of liquid from the supply line can be regulated as required to maintain the liquid in the chamber at a level above the lower edges of the hood 40. While various types of conventional, automatic control apparatus can be used, the supply line is illustrated with a float actuated control valve 72. The valve opens when the level of the liquid within the chamber falls below a specific level which is still above the lower edges of walls 46 and 48. Of course, when the liquid level equals or exceeds this level, the valve closes.

Some of the liquid separated in the wet process machine 30 can be utilized to supply the spray nozzles 58 and 60 within the collection chamber. This liquid is directed from the wet process machine 30 to a conventional liquid clarifier 74 through a fluid conduit 76. There, the sludge is separated from the liquid and removed through a valve at the bottom of the clarifier. The clarified liquid is then pumped by a pump 78 through the fluid conduit 76 back to the spray nozzles 58 and 60.

In operation, glass filaments 50 are formed by the fiberizing apparatus 24 such as rotary fiberizing apparatus. These filaments pass down through the glass fiber length control devices 26 which chop or otherwise form the filaments 50 into fibers 52 of discrete lengths. The air streams, passing through the openings 54, direct the fibers down toward the body of liquid 28 in the bottom of the inner compartment 42. The air stream pass through the liquid and under the hood 40 picking up moisture in the process. The pickup of moisture by the air streams causes the fibers in the air streams to pickup moisture and become heavier. This pickup of moisture, combined with the reductions in velocity of the air streams as they pass up through the portions of compartments 44 having the enlarged cross-sectional areas, effects a further removal of fibers from the air streams.

In addition to the above, the spray nozzles 58 and 60 which are located in the inner compartment 42 and the outer compartments 44, direct sprays of liquid into the air streams passing through the collection chamber to help remove any stray fibers which might remain in the air stream and deposit these fibers into the body of liquid 28. The air streams with the fibers removed are then exhausted to the atmosphere through exhaust lines 56. The slurry thus formed in the body of liquid 28 is delivered to the wet process machine 30 through the fluid conduit 62.

In the wet process machine 30, the liquid of the slurry is separated from the fiber 52 with the fiber being formed into a mat or some other product. The liquid, which has been separated from the fiber in the wet process machine is then either sent directly back to the body of liquid 28 through fluid conduit 68 or clarified in the clarifier 74 and pumped back to the spray nozzles 58 and 60 of the collection chamber. Consequently, substantially all of the liquid utilized to form the slurry is recycled thereby eliminating to a very great extent, the ecological problems associated with the disposal of the slurry liquid. Any liquid which is lost during the process, is made up by supply line 70 and the level of the body of liquid 28 in the chamber is maintained above the lower edge of the hood 40 and at the desired level by the control valve 72 and the conduit 64 to assure the continuous operation of the process.

The slurry concentration is controlled by the recirculation rate of the liquid and for the rate at which the fibers 52 are formed and introduced in the liquid. Thus, the slurry concentration can be varied to meet the requirements of a particular process.

What I claim is:

1. A method of forming a glass fiber slurry comprising:
   a. forming fibers of discrete lengths above a body of liquid within a collection chamber having sidewalls extending substantially from a fiberizing means for forming the fibers down into the body of liquid;
   b. directing the fibers toward the body of liquid by means of a gas stream; and
   c. passing the gas stream through the body of liquid and beneath the side walls to deposit the fibers in the body of liquid and pass the gas from the collection chamber.

2. The method as defined in claim 1, comprising: forming continuous filaments in the collection chamber, and dividing the filaments into the fibers of discrete lengths.

3. The method as defined in claim 1 comprising: wetting the fibers in the gas stream to help direct the fibers into the body of liquid by spraying liquid into the gas stream.

4. The method as defined in claim 1 comprising: directing the gas stream up and away from the body of liquid after the gas stream passes through the liquid and beneath the side walls, and reducing the velocity of the gas stream as it moves upward to help effect the removal of the fibers from the gas stream.

5. A method of forming a glass fiber mat comprising:

a. forming fibers of discrete lengths over a body of liquid within a collection chamber having sidewalls extending substantially from a fiberizing means for forming the fibers down into the body of liquid;
   b. directing the fibers toward the body of liquid by means of a gas stream;
   c. depositing the fibers in the body of liquid to form a fiber slurry by passing the gas stream through the body of liquid and beneath the sidewalls; and
   d. passing the fiber slurry through a wet mat machine to separate the fibers from the liquid to form the mat.

6. The method as defined in claim 5 comprising: depositing the slurry on a screen means to separate the liquid from the fibers.

7. The method as defined in claim 5 comprising: returning at least some of the liquid which is separated from the fibers to the body of liquid.

8. The method as defined in claim 5 comprising: forming continuous filaments in the collection chamber, and dividing the filaments into the fibers of discrete lengths.

9. The method as defined in claim 5 comprising: wetting the fibers in the gas stream to help remove the fibers from the gas stream and help deposit the fibers in the body of liquid.

10. The method as defined in claim 9 comprising: wetting the fibers of the gas stream to help direct the fibers into the body of liquid by spraying liquid into the gas stream.

11. The method as defined in claim 9 comprising: directing the gas stream up and away from the body of liquid after the gas stream passes through the liquid and beneath the sidewalls and reducing the velocity of the gas stream as the gas stream moves upward to help effect the removal of the fibers from the gas stream.

12. An apparatus for forming a glass fiber slurry comprising:
   a. a collection chamber having sidewalls extending down into a body of liquid;
   b. means for forming fibers of discrete lengths above the body of liquid within the collection chamber; and
   c. means for directing a gas stream down past said fiber forming means through said collection chamber, said body of liquid and beneath lower edges of said sidewalls to deposit fibers formed by said fiber forming means in said body of liquid.

13. The apparatus as defined in claim 12 including means for directing a spray of liquid into the gas stream to wet the glass fibers and thereby help effect the removal of the glass fibers from the gas stream and help deposit the glass fiber into the body of liquid.

14. An apparatus for forming a mat of glass fiber comprising:
   a. a collection chamber having sidewalls extending down into a body of liquid;
   b. means for forming fibers of discrete lengths above the body of liquid within the collection chamber;
   c. means for directing a gas stream down past said fiber forming means through said collection chamber, said body of liquid and beneath lower edges of said sidewalls to deposit fibers formed by said fiber forming means in said body of liquid to form a slurry;
   d. means for separating the liquid and the fibers of slurry to form a mat; and
   e. means for passing said slurry through said separating means.

15. The apparatus as defined in claim 14 wherein: said separating means includes a screen.

16. The apparatus as defined in claim 14 including spray means for directing a spray of liquid into the gas stream to wet the glass fibers and thereby help effect the removal of the glass fibers from the gas stream and help deposit of the glass fiber into the body of liquid.

* * * * *